Figures 1, 2:
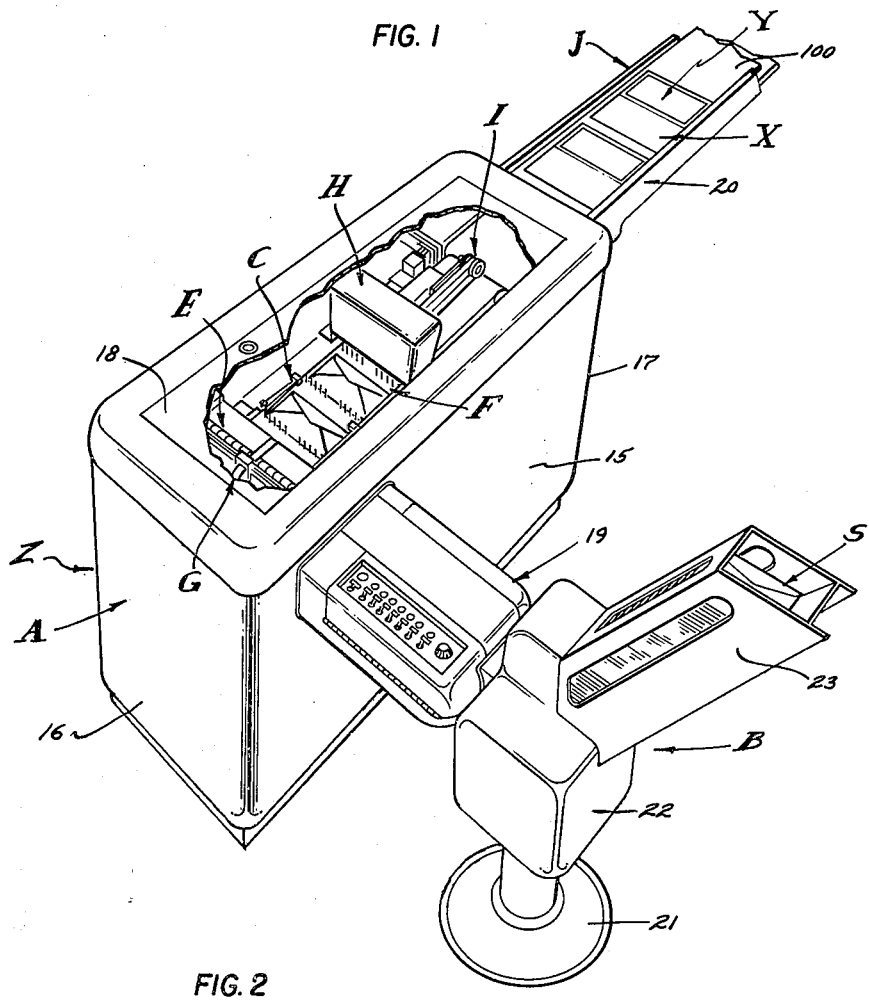

Jan. 7, 1964  E. A. KRUPOTICH ETAL  3,116,718
ENVELOPE OPENER AND DISTRIBUTION APPARATUS
Filed Aug. 17, 1959  8 Sheets-Sheet 1

INVENTOR.
EDWARD A. KRUPOTICH
BY EDWIN F. PIERCE
ROBERT E. BERG

AGENT

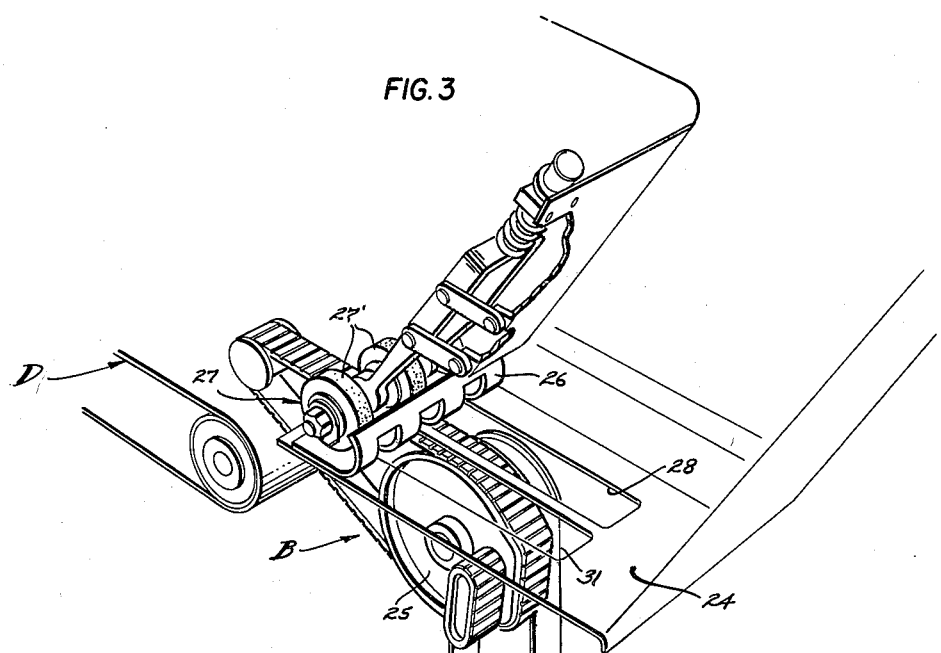
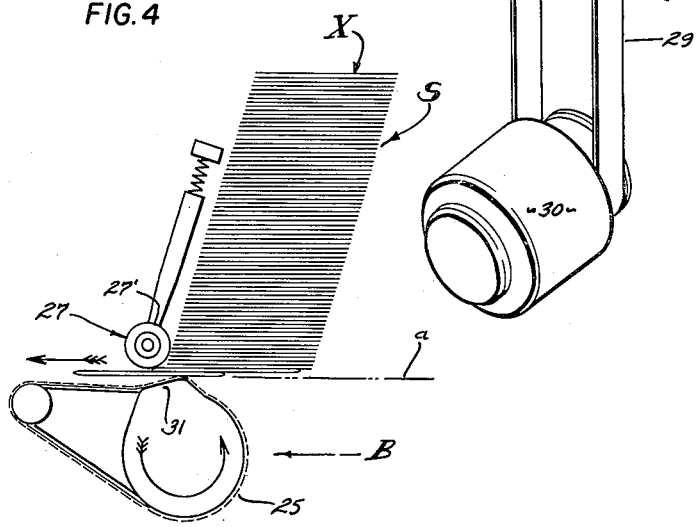

Jan. 7, 1964   E. A. KRUPOTICH ETAL   3,116,718
ENVELOPE OPENER AND DISTRIBUTION APPARATUS
Filed Aug. 17, 1959   8 Sheets-Sheet 3

INVENTOR.
EDWARD A. KRUPOTICH
BY EDWIN F. PIERCE
ROBERT E. BERG

AGENT

Jan. 7, 1964 E. A. KRUPOTICH ETAL 3,116,718
ENVELOPE OPENER AND DISTRIBUTION APPARATUS
Filed Aug. 17, 1959 8 Sheets-Sheet 4

INVENTOR.
EDWARD A. KRUPOTICH
BY EDWIN F. PIERCE
ROBERT E. BERG

AGENT

Jan. 7, 1964  E. A. KRUPOTICH ETAL  3,116,718
ENVELOPE OPENER AND DISTRIBUTION APPARATUS
Filed Aug. 17, 1959  8 Sheets-Sheet 5
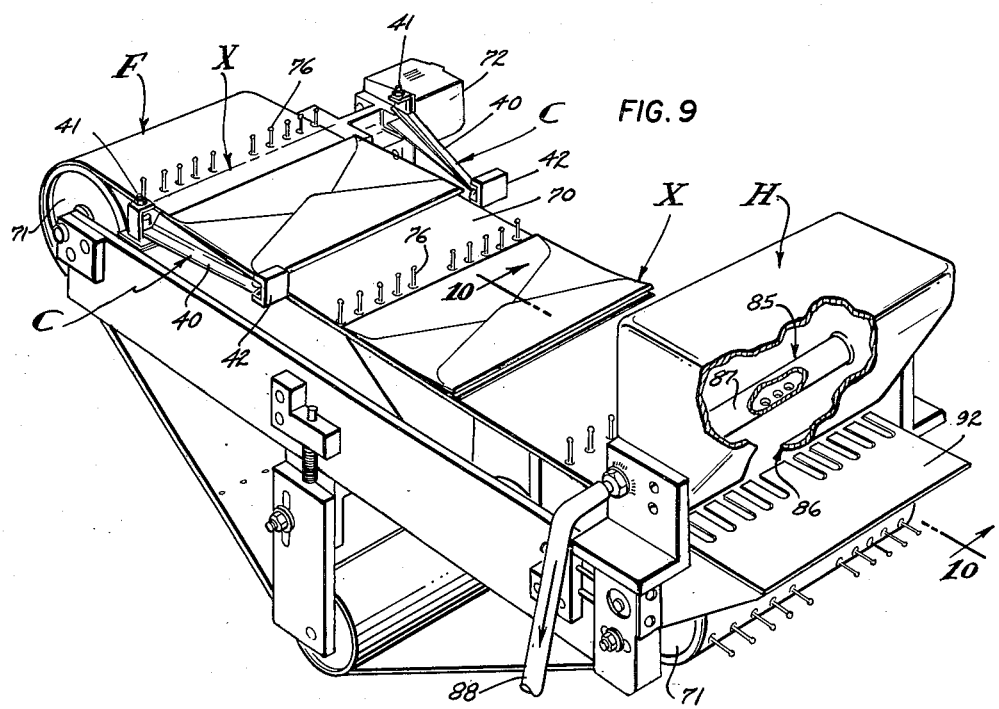
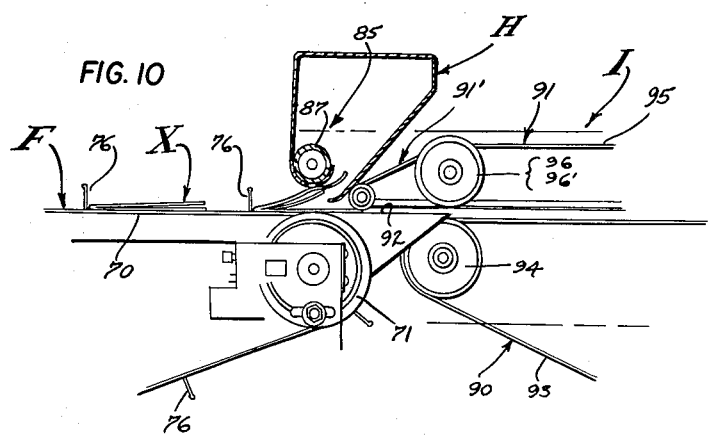
INVENTOR.
EDWARD A. KRUPOTICH
BY EDWIN F. PIERCE
ROBERT E. BERG
AGENT Jan. 7, 1964 E. A. KRUPOTICH ETAL 3,116,718
ENVELOPE OPENER AND DISTRIBUTION APPARATUS
Filed Aug. 17, 1959 8 Sheets-Sheet 6
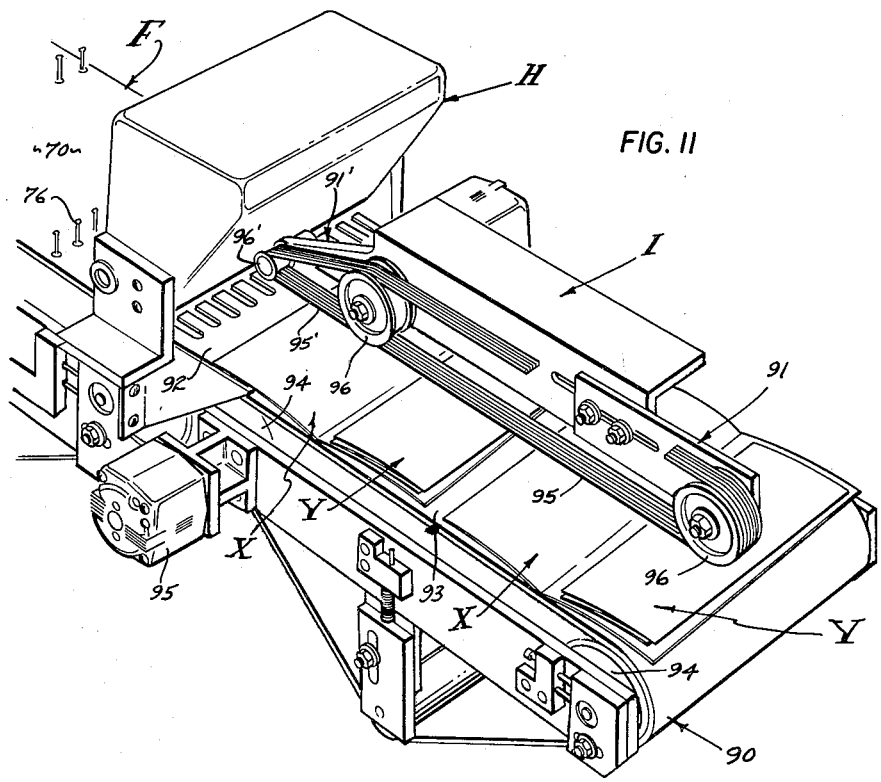
FIG. 11
FIG. 12
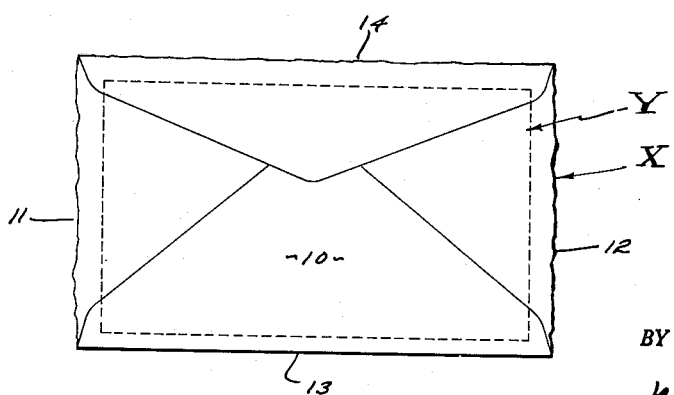
INVENTOR.
EDWARD A. KRUPOTICH
BY EDWIN F. PIERCE
ROBERT E. BERG
AGENT Jan. 7, 1964  E. A. KRUPOTICH ETAL  3,116,718
ENVELOPE OPENER AND DISTRIBUTION APPARATUS
Filed Aug. 17, 1959  8 Sheets-Sheet 7
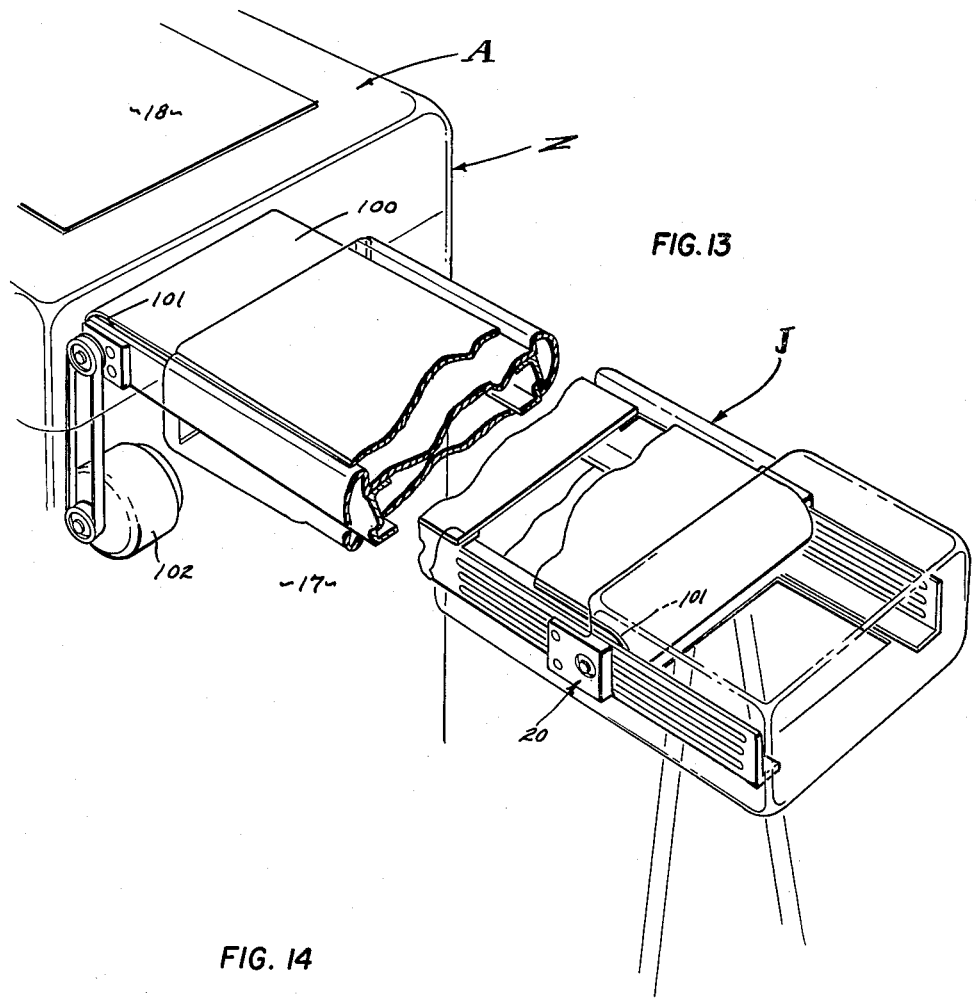
FIG. 13
FIG. 14
INVENTOR.
EDWARD A. KRUPOTICH
BY EDWIN F. PIERCE
ROBERT E. BERG
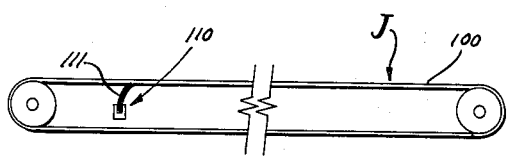
AGENT Jan. 7, 1964 E. A. KRUPOTICH ETAL 3,116,718
ENVELOPE OPENER AND DISTRIBUTION APPARATUS
Filed Aug. 17, 1959 8 Sheets-Sheet 8

INVENTOR.
EDWARD A. KRUPOTICH
BY EDWIN F. PIERCE
ROBERT E. BERG

AGENT

United States Patent Office 3,116,718
Patented Jan. 7, 1964

3,116,718
ENVELOPE OPENER AND DISTRIBUTION
APPARATUS
Edward A. Krupotich, Los Angeles, Edwin F. Pierce, La
Canada, and Robert E. Berg, Granada Hills, Calif.,
assignors to Thomas W. Evans, Howard J. Sherman,
and Wilbur Clark, Beverly Hills, Calif., partners
Filed Aug. 17, 1959, Ser. No. 834,015
14 Claims. (Cl. 120—35)

This invention has to do with the opening of envelopes and the extraction of contents therefrom and is particularly concerned with the handling and processing of large volumes of incoming envelopes delivered through the mail services and which require opening in order to expose and extract the contents thereof, it being a general object of this invention to provide an apparatus that automatically feeds and opens a continuous supply of envelopes, one by one, and at the desired frequency, and which distributes said envelopes onto a moving conveyor in an open condition with the contents thereof exposed and accessible for extracting and removal.

Envelopes are such as to require opening along one or more of the sides thereof, said envelopes being rectangularly shaped closures in the form of flattened bags, usually of paper, and having pairs of straight and parallel sides. More specifically, an envelope is a prepared wrapper for a letter or paper, for example, a remittance, and so made that it can be sealed, the seal being by a gummed flap folded over to overlie one face of the envelope or wrapper. In any case, manual labor has been universally employed to open envelopes, by cutting open one or more sides of the envelope with a suitable instrument, for example, with a slitter or mechanical cutter, after which operation the contents are extracted by reaching into the envelope with the fingers or by tearing the envelope apart and removing the contents. Thus, it is apparent that several manual operations are usually necessary in the processing of envelopes to open them and to extract the contents therefrom.

Envelopes, as referred to above, are used commercially to secure remittances for services, products, premiums and for replies and sales in general. In many businesses a very large volume of mailed envelopes must be handled and processed, these envelopes being return addressed envelopes of uniform size in order to avoid error in mailing and to facilitate manual processes of opening said mail. Therefore, it is common practice for a business to receive large volumes of uniform sized envelopes which require opening and which ordinarily require a substantial crew of personnel whose work involves manual opening of said envelopes and the distribution of stubs and payment checks received together in a single envelope.

An object of this invention is to consecutively handle one envelope at a time, to cut open said envelopes, and to unfold them and thereby expose the contents thereof to be accessible for extraction and removal and distribution. The apparatus is powered and automatically processes the envelopes one by one in consecutive order and delivers said processed envelopes and contents upon a conveyor for the interception by personnel, or the like.

Another object of this invention is to provide an apparatus that opens envelopes and wherein envelopes supplied at one position are handled and processed thereby and are delivered at another position in an opened condition with the contents thereof exposed to be intercepted by personnel and the contents manually selected.

It is an object of this invention to provide cutting means adapted to separate the material of envelopes along the edges thereof, or sides and ends thereof, and which reliably severs any connection therebetween and to the end that the envelope parts are free to be separated and unfolded.

It is another object of this invention to convey and consecutively move envelopes along the above mentioned cutting means, and preferably along separate angularly related cutting means, in which case conveyors are employed. In order to carry out this objective, angularly related conveyors are employed and means provided to receive and center the envelopes as they are transferred from one conveyor to the other.

Still another object of this invention is to unfold cut or severed envelopes so as to expose the contents thereof, a means being provided to lift and lay back one side of the envelope relative to the other side. The unfolding means that is provided operates in conjunction with a moving conveyor and there is a retaining means that coacts wtih the conveyor to hold the envelope and its contents onto the conveyor for deposit thereof onto a delivery conveyor.

It is still another object of this invention to provide a compact and reliable apparatus embodying the features above referred to and which is operable throughout a wide speed range to process like or similar envelopes of a range of sizes and distribute them for manual selection, or the like.

Figure 5:
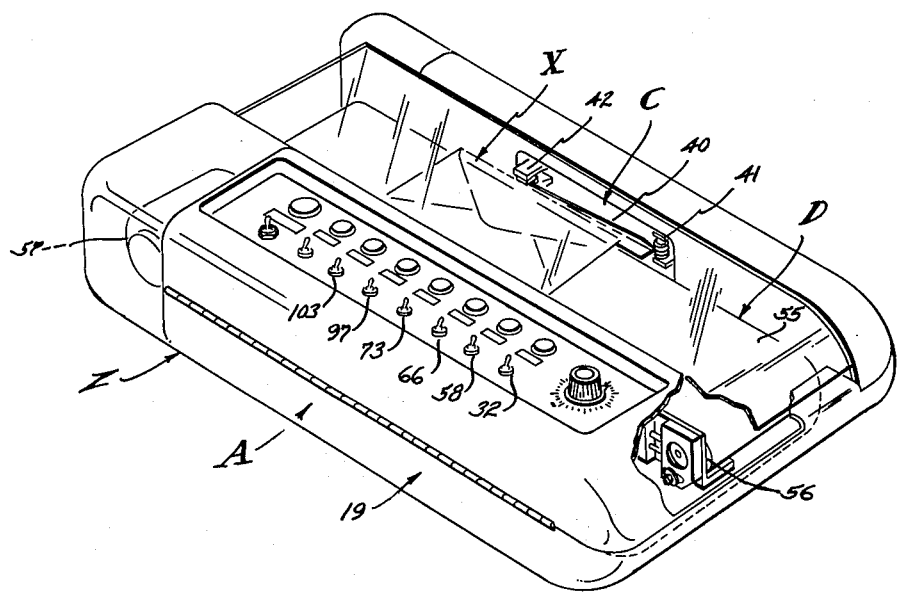
Figure 6:
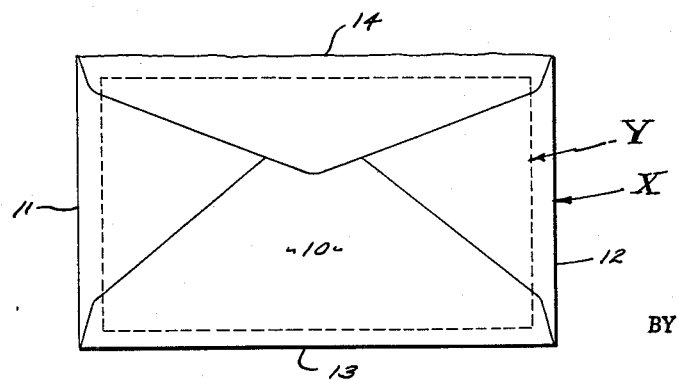
Figure 7:
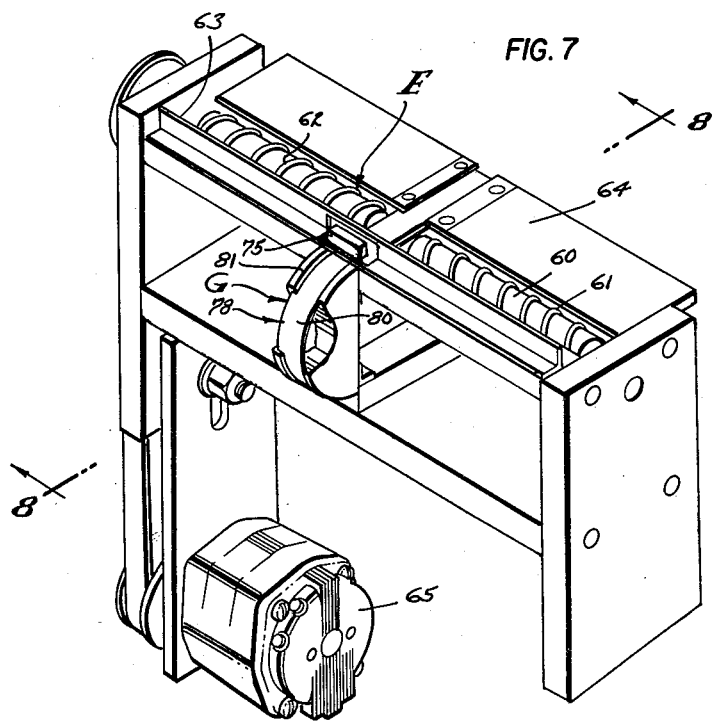
Figure 8:
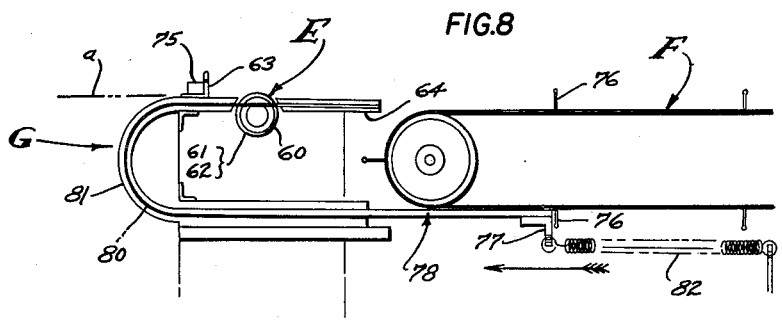
Figure 15:
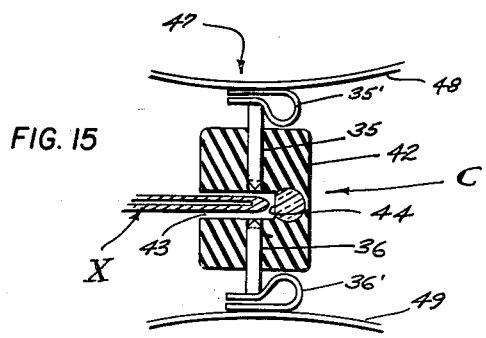
Figure 16:
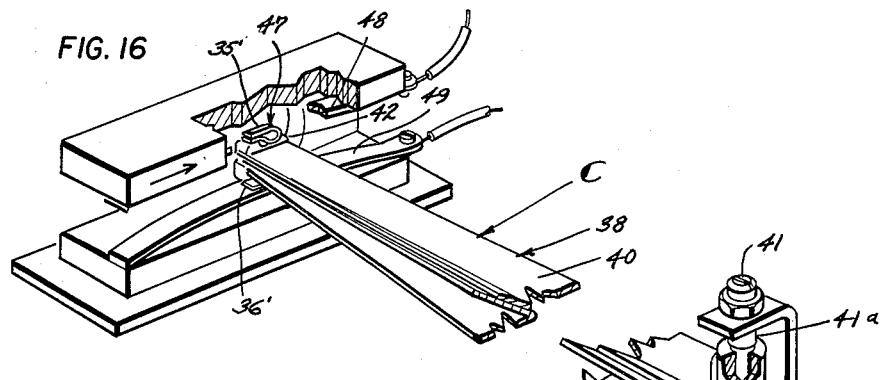
Figure 17:
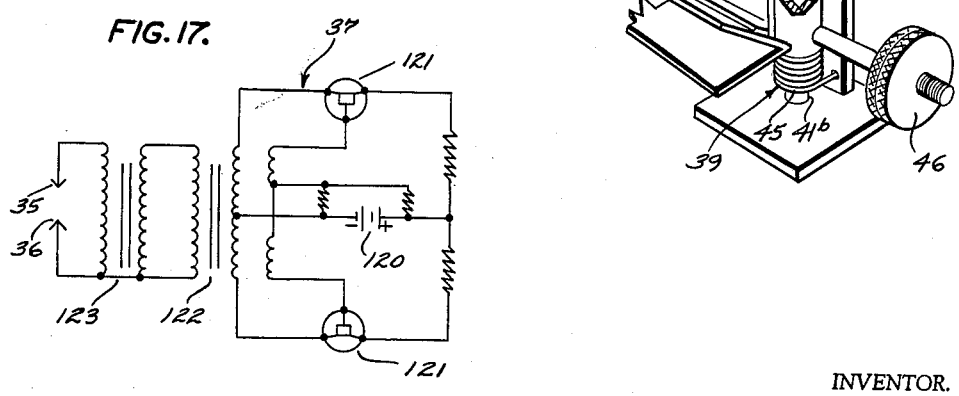

The various objects and features of this invention will be fully understood from the following detailed description thereof throughout which description reference is made to the accompanying drawings, in which:

FIG. 1 is a perspective view of a typical embodiment of the apparatus of the present invention and shows a stack of envelopes as they are received by the apparatus to be processed thereby and shows the manner in which the opened envelopes are delivered with the contents thereof exposed for manual selection. FIG. 2 is a view of a typical envelope to be processed and handled by the apparatus herein disclosed. FIG. 3 is a fragmentary perspective view of the supply means that is provided and which receives a stack of envelopes and delivers them continuously one at a time. FIG. 4 is a diagrammatic side view of the supply means. FIG. 5 is a perspective view of a portion of the apparatus and illustrates the primary conveyor that is provided and its relationship to one of the cutting means of the apparatus. FIG. 6 is a view similar to FIG. 2 and shows the manner in which one side edge of the envelope is cut or severed by the process involved in connection with the parts of the apparatus shown in FIG. 5. FIG. 7 is a perspective view of a portion of the apparatus and illustrates the transferring means and centering means that are provided to handle the envelopes as they move from the primary conveyor to the secondary conveyor. FIG. 8 is a sectional view taken as indicated by line 8—8 on FIG. 7. FIG. 9 is a perspective view of a portion of the apparatus and shows the secondary conveyor as it is related to the cutting means that cooperate therewith and as it is related to the unfolding means of the apparatus. FIG. 10 is a sectional view of a portion of the structure shown in FIG. 9 and taken substantially as indicated by line 10—10 on FIG. 9. FIG. 11 is a perspective view of a portion of the structure showing the unfolding means that is illustrated in FIGS. 11 and 12 and shows the retaining means provided to draw the envelopes and contens from the said unfolding means in an opened condition with said contents exposed. FIG. 12 is a view similar to FIGS. 2 and 6 and illustrates the envelope as it appears after the cutting operations are completed and said envelope is ready for unfolding. FIG. 13 is a perspective view and shows a portion of the structure and the delivery conveyor thereof. FIG. 14 is a diagrammatic view showing the electrical circuit involved in the cutting means of the apparatus. FIG. 15 is an enlarged detailed view of the cutting head of the apparatus with portions thereof broken away to show in section. FIG. 16 is a perspective view of one of the cutting means of the apparatus and showing the manner in which the head (of FIG. 15) is shiftably carried, and FIG. 17 is a view showing the manner in which the delivery conveyor is electrostatically charged in order to retain the opened envelopes and contents thereon.

The apparatus herein disclosed is useful in handling and processing envelopes to open and unfold them for the purpose of exposing the contents therein. As clearly illustrated in FIG. 1 of the drawings, envelopes X are fed into the apparatus Z at one position and are delivered at another position in an opened and unfolded condition with the contents Y thereof exposed. The apparatus Z is a unit of construction with interrelated means adapted to process envelopes continuously and consecutively and one at a time, and at a frequency as desired. The apparatus Z is adapted to handle a stack S of envelopes X which are individually dispensed through the apparatus for cutting, for unfolding, and for delivery at spaced intervals along a conveyor and in an opened condition. The handling process is carried out by the apparatus with the combination of means involved operating in timed relationship and under control of an operator, the individual means and operations being provided with variable speed controls so that the frequency and rapidity of delivery can be altered to suit the subsequent handling of the opened envelopes and contents.

In FIG. 2 of the drawings a typical envelope X is shown and which is in the nature of a flattened bag, or wrapper, made of folded sheet material, for example, of paper or the like. The back face 10 of the envelope is shown with the usual folds at three edges, 11, 12 and 13, and so that there are three portions of the sheet material that have overlapped engagement with adhesive securement therebetween, and forming said back face 10. The envelope is closed by means of a flap that extends from the fourth edge 14 to fold down and to overlie the above mentioned folds, said flap having a gummed marginal portion for adhesion to the back face 10 for sealing. It will be apparent that the envelope X is adapted to contain the contents Y in the form of one or more pieces of paper, or the like.

The apparatus Z is a powered device that functions to handle and process envelopes as above recited, and it involves, generally, a housing A, a supply means B, a cutting means C, a primary conveyor D, a centering means E, a secondary conveyor F, a transfer means G, an unfolding means H, a retaining means I, and a delivery conveyor J. The housing A provides for support and enclosure of the mechanisms involved, while the supply means B and delivery conveyor J are accessible at two separated positions on the said housing. The primary and secondary conveyors D and F operate to move the envelope X through the apparatus Y for processing by the cutting means C and unfolding means H. The centering means E and transfer means G function to effect transition of the envelopes X from the primary conveyor D to the secondary conveyor F, and the retaining means I functions to secure the envelopes X and contents Y on the conveyor at the unfolding means H. The remaining refinements and features will be hereinafter described as they are related to the above mentioned means and elements of the apparatus.

The housing A can vary widely as circumstances require and is preferably an elongate upright cabinet with side walls 15, a front end 16 and a rear end 17. The cabinet is adapted for support on a flat surface or floor and it has a flat horizontally disposed top formed by a removable cover 18 for access to the mechanisms therein. The particular apparatus herein disclosed requires the incorporation of certain features in the housing A, there being a lateral extension 19 at the end 16 and adjacent the cover 18, said lateral extension projecting normally to one side of the cabinet, and there being a longitudinal extension 20 at the end 17, said longitudinal extension projecting from the cabinet adjacent the cover 18. As shown in FIG. 1, the supply means B is provided with its own pedestal support 21 and housing 22 and operates to dispense envelopes X into and through the apparatus by depositing them at the terminal end of the lateral extension 19.

The supply means B is an envelope dispenser that is adapted to receive a stack S of envelopes X and to deliver them continuously one at a time and in a lateral direction and in a horizontal plane. Therefore, the support 21 positions the housing 22 of the means B to occur adjacent the lateral extension 19 of the housing A, with the delivery plane of the means B positioned to dispense envelopes into the housing A for processing by the means C and H, etc. The supply means B is a powered means and involves a feed chute 23, an envelope support 24, a drive wheel 25, a guide 26, and a stop 27. The feed chute 23 is shown as a gravity feed chute and is substantially vertically disposed and has sides spaced to engage with the edges 11 through 14, with suitable clearance, of the envelopes X to form them into the stack S. It will be apparent that different chutes 23 can be employed for different sized envelopes, or the said chute 23 can be adjustable if so desired. The envelope support 24 closes the lower end of the chute 23, the upper end thereof being open for the reception of additional envelopes as the apparatus operates continuously.

The said support 24 sipositioned in a horizontal dispensing plane $a$ (see FIGS. 3 and 4) and is a flat plate plate element that positions the lowermost envelope X. The said support has an aperture 28 therein, preferably a pair of spaced apertures, of substantial longitudinal extent and provided to pass the peripheral portions of the drive wheel 25. As shown in FIGS. 3 and 4, the drive wheel 25 has a pulley portion operated by a belt 29 driven by a motor 30, and it has a projecting peripheral portion or portions 31 of limited circumferential extent that extend through the apertures 28 to engage the underside of the lowermost envelope X. The peripheries of portions 31 are faced with frictional material, or pads, that grip the envelopes X to move them laterally in a forward direction, as indicated by the arrow in FIG. 4 to be dispensed from the means B. The guide 26 is shown in FIG. 3 and is an upwardly curved platelike part engages the forward edges of the lowermost envelopes X. The guide 26 has a flat body spaced from the support 24 the thickness of one or two envelopes. In order to assure issuance of a single envelope at a time, there is an opening in the guide 26 and the stop 27 is provided that involves lugs 27' faced with frictional material and spaced above the support 24 to engage through said opening in the guide and stop only the envelope second from the bottom. It will be apparent that the motor 30 can be operated at a speed to obtain the desired frequency of envelopes at the plane $a$ and into the lateral extension 19 of the housing A. The motor 30 is energized through a switch 32 (see FIG. 5) and through a suitable speed control (not shown).

The cutting means C is provided to destroy one or more edges 11 through 14 of the envelope X, and in carrying out the invention there is a separate means C to cut each edge to be destroyed. In order to unfold, that is, to completely unfold the material forming the envelope X, it is necessary to cut and destroy at least three edges of the envelope, for example, the two end edges 11 and 12 and at least one side edge 13 or 14. Therefore, one of said edges is normally related to the other edges, thus requiring cutting of one edge in one direction and of the two other edges in a direction normal to the first mentioned edge. With the apparatus herein disclosed, the envelopes are rectilinearly moved by the primary and secondary conveyors D and F to be acted upon by the cutting means C in which case one cutting means C is provided to destroy the edge 14 (or 13) while a pair of cutting means C is provided to destroy the edges 11 and 12. Further, as shown in FIG. 5, the single means C cooperates with the primary conveyor D to cut and destroy the edge 14 (or 13) while in FIG. 9 the pair of means C cooperate with the secondary conveyor F to cut and destroy the edges 11 and 12.

The cutting means C are alike, and so far as the overall apparatus is concerned, they can vary in type and construction. That is, the cutting means C can be a mechanical scissors type shears, or an abrading cutter, or even a chemical applicator with a wetting member, all to destroy the folded edges of the envelope X, as specified. However, it is preferred that the cutting means C be an electromechanical means, as illustrated in detail in FIGS. 15, 16 and 17, and which involves, generally, a pair of spaced electrodes 35 and 36 and a high tension electrical power supply 37. The electrodes 35 and 36 are continuously energized during the cutting action desired, the power supply 37 transmitting a high voltage current for discharge between the two electrodes, causing an arc of substantial destructive character, so far as paper or the like is concerned. Therefore, and in accordance with the present invention, the edges (11 through 14) or folded extremities of the envelope X are brought into proximity of the electrodes to be positioned therebetween and the high voltage discharge strikes by or through the material of the envelope edges thereby destroying them. In practice, the arc is so proportioned and positioned as to follow and cut and destroy the entire edge or folded margin of the envelope X, and in the process thereof any and all fibres are also disintegrated, all to the end that the two opposite faces of the envelope are free from each other.

As will be later described, the envelopes X are conveyed rectilinearly by conveyors to be passed by or through the several means C. Therefore, the means C are adapted to engage the said edges of the envelopes as they are moved forwardly by the conveyors. In order to position the electrodes 35 and 36 to produce the cutting action above described, the means C involves a carriage 38 for said electrodes and means 39 yieldingly urging the said carriage and the electrodes into a cutting position relative to the envelope edge. In the preferred form, the carriage 38 is an arm-type element 40 pivotally mounted at 41 to trail in the direction of movement of the envelope. The element 40 is of substantial length and projects horizontally from the pivot at 41, said pivot comprising adjustable needle bearings 41ᵃ and 41ᵇ for freedom of rotation. In accordance with the invention, the arm element 40 is in the form of a narrowing channel or trough widened at the forward end and restricted as it progresses to its terminal end where there is a head 42 of insulating material. The trough of the element 40 opens inwardly to have guiding engagement with the edges of the envelope and it is a V-shaped trough with the vertex thereof aligned with a notch 43 in the head 42. The notch 43 has spaced upper and lower walls to freely pass the thickness of the envelope, at the edge thereof, and it has a bottom 44 to limit entry of the envelope edge into said notch. The bottom 44 is lined with, or established by an element of hard non-conductive material, for example, quartz crystal, forming a bearing upon or at which the envelope edge rides. There is a pair of upper and lower aligned openings through the head 42 and carrying the spaced electrodes 35 and 36 which are vertically disposed, said openings entering the notch 43 at the bottom 44 and so that the arc strikes by or through the edge of the envelope, as shown.

The arm type element 40, above described, is a trailing arm that carries the head 42 to swing inwardly and outwardly to accommodate the width of the envelope X that passes thereby. The means 39 that yieldingly urges the head 42 toward the envelope edge is a spring means or the like and it involves a tension spring 45 at or surrounding the pivotal mounting 41, biasing the head 42 lightly inwardly. As shown in FIG. 16, there is a counter balance 46 opposite said pivotal mounting so that the head 42 and arm element 40 can be moved with little effort.

In order to establish electrical connection with the electrodes 35 and 36 commutation with the head 42 is provided through a brush assembly 47. As shown, in FIG. 15, brush members 35' and 36' project upwardly and downwardly from the electrodes 35 and 36, respectively. Electrical contact is made by complementary contact leaves 48 and 49 that extend transversely and in a direction coincidental with the swing of the head 42. The leaves 48 and 49 are substantially parallel and are biased toward the brush contacts 35' and 36', respectively. Thus, it will be apparent that the brush assembly 47 is in constant electrical contact. As shown, the contact leaves 48 and 49 are carried by upper and lower insulators and they are connected with power lines leading from the power supply 37.

The power supply 37 is provided to produce high voltage electrical energy at the electrodes 35 and 36 and it is preferably an electronic-type power supply as best illustrated in FIG. 17 of the drawings. As shown, the power supply involves an electrical circuit comprising components adapted to invert a source of electrical current into a high frequency current adapted to discharge between the electrodes that are involved in the apparatus as above described. In the particular case illustrated, there is a source of D.C. voltage indicated as a battery 120, or the like, and there is a pair of power switching transistors 121 arranged in cooperative relationship with each other and with suitable resistors and in a suitable circuit in order to provide the desired frequency and magnitude of current. The output of the circuit and elements just described is received by a voltage step-up transformer 122 and fed into a second high voltage output transformer 123 that has leads for connection to the electrodes 35 and 36 of the several cutting means C of the apparatus.

The primary conveyor D is best illustrated in FIG. 5 of the drawings and is provided to receive the envelopes X from the supply means B and to transport them one by one to pass by a cutting means C and to the centering means E to be acted upon by the transfer means G for deposit onto the secondary conveyor F. As shown, the conveyor D is a belt-type conveyor involving a continuous flexible belt 55 extending between spaced rollers 56 and driven by a motor 57 through a suitable drive. The motor 57 is energized through a switch 58 (see FIG. 5) and through a suitable speed control (not shown). The said rollers 56 are journaled in the housing extension 19 so that the top portion of the conveyor is in an upwardly facing plane coincidental with the plane $a$ above referred to and so that said top portion extends transversely relative to the longitudinally disposed housing A and normal to the secondary conveyor F. The top portion of the conveyor D operates to move forwardly and inwardly toward the housing A, the envelopes X being delivered off of the end of the said conveyor and onto the centering means E later described.

In carrying out the invention, the conveyor D is of such width or is so proportioned as to allow one side margin or edge portion of the envelope to overhang the edge of said conveyor belt 55 (see FIG. 5) and this permits unhindered engagement of the cutting means C with the edge 14 (or 13) of the envelope X, to the end that the said edge is destroyed as the head 42 of the means C swings into light pressured engagement with the envelope when it moves forwardly and passes by said head. Thus, the edge 14 (or 13) is cut or destroyed as is indicated in FIG. 6 of the drawings.

The centering means E is best illustrated in FIG. 7 of the drawings and is provided to receive the partially processed envelope X from the primary conveyor D and to orient it for deposit onto the secondary conveyor F by the transfer means G. The centering means E involves a friction roll 60 positioned at the delivery end of the primary conveyor D and extending transversely of the housing A (see FIG. 1). The said roll 60 has its top periphery positioned to occur at or in the plane $a$ and the axis of said roll 60 is positioned to occur beneath the center of each envelope X that is delivered off the end of the conveyor D. In order to have a centering action on the envelope X, the roll 60 is sectional having right and left hand helically formed friction ribs 61 and 62. The roll 60 is rotated so that the ribs 61 and 62 feed inwardly toward the center of the roll, the center of the roll 60 being aligned with the center of the secondary conveyor F. Further, the centering means E involves a rail 63 against which one edge of the envelope X rides as it is moved centrally by the rib 62 and centered by coaction of the rib 61. The said rail 63 presents a vertically disposed wall parallel with the roll 60 and against which the envelope slidably engages.

It will be apparent that the rotation of the roll 60 causes the envelopes to be held against the rail 63, said envelopes being retained in a horizontal plane by a platen 64 at the side of the roll 60 opposite the rail 63, the entire length length of the roll 60 being exposed. As shown, the rail 63 is at the forward side of the roll, toward which the roll turns, and the platen is at the side of the roll 60 toward the rear or delivery end of the housing A. A motor 65 operates the roll 60 through a suitable drive and is energized through a switch 66 (see FIG. 5) and through a suitable speed control (not shown).

The secondary conveyor F is best illustrated in FIG. 9 of the drawings and is provided to receive the partially processed envelopes X from the centering means E and to transport them one by one to pass by a pair of cutting means C and to pass by the unfolding means H. As shown, the conveyor F is a belt-type conveyor involving a continuous flexible belt 70 extending between spaced rollers 71 and driven by a motor 72 through a suitable drive. The motor 72 is energized through a swtich 73 (see FIG. 5) and through a suitable speed control (not shown). The said rollers 71 are journaled in the housing A on longitudinally spaced axes that extend tranversely of the housing and so that the top portion of the conveyor is in an upwardly facing plane coincidental with the plane $a$ above referred to and so that the conveyor F is normal to the conveyor D. The conveyor F is such as to move the envelopes forwardly in the processing thereof and toward the rear end 17 of the apparatus to be deposited upon the delivery conveyor J.

In carrying out the invention, the conveyor F is of such width as to allow opposite marginal portions or edges of the envelopes X to overhang the opposite edges of said conveyor belt 70 (see FIG. 9) and this permits unhindered engagement of the cutting means C with the edges 11 and 12 of the envelope X, there being a cutting means C at each side of the conveyor F, and to the end that the said edges are destroyed as the heads 42 of said means swing into light pressured engagement with the envelopes when they move forwardly and pass by said opposite heads. Thus, the edges 11 and 12 are cut or destroyed as is indicated in FIG. 12 of the drawings.

As clearly shown in FIG. 9 the pair of cutting means C are oppositely placed at the forward portion of the conveyor F while the unfolding means H is placed at the rear portion of said conveyor, and so that the cutting processes precede the unfolding process. In carrying out the invention, the arm elements 40 and head 42, and related parts, are of light weight construction and the spring pressure of the means 39 is so light that the means C are engageable with the envelopes X without moving or displacing the envelopes from their resting positions upon the conveyors D and F.

The transfer means G is illustrated in FIGS. 7 and 8 of the drawings and is provided to move envelopes from the centering means E onto the secondary conveyor F and thereby transfer the envelopes from movement transversely of the housing A to movement longitudinally thereof. As shown, the means G operates in the direction of movement of the conveyor F and it is aligned with the center of the centering means E and with the center of said conveyor F. Further, the transfer means G is operated in timed relationship with the secondary conveyor F and also in timed relationship with the primary conveyor D. That is, the transfer means G operates to move each envelope deposited on the centering means E by the conveyor D and to place it upon the conveyor F. Therefore, the two conveyors D and F are operated at the same linear speed or in timed relationship, and so that each envelope is picked up and moved onto the conveyor F after it has been centered by the means E.

The transfer means G involves a reciprocating part 75 that is operable to engage and shift an envelope X by engaging one side thereof, the side 13 or 14, as the case may be. In carrying out the invention, the part 75 is actuated to reciprocate by motion of the conveyor belt 70 and so that said part 75 is readily timed with motion of said belt. Therefore, the particular means G illustrated involves, a lug 76 on the belt 70, a follower 77 to be engaged and operated by the lug, and a drive 78 between the follower 77 and the envelope engaging part 75. Since a series of envelopes are supported on the belt 70, there are spaced lugs 76 in a continuous series and equally spaced one from the other. The said lugs 76 have a two-fold purpose in that they also act as cleats, or the like, to have driving engagement with the said envelopes X to drive said envelopes through the cutting means C and through the unfolding means later described. Therefore, each lug 76 is a straight elongated projection, or a straight series of projections, that extends transversely of the belt 70 to engage one edge of the envelope. As the belt 70 is operated to advance envelopes thereon, the lugs 76 at the lower belt portion move reversely, or toward the front end of the conveyor, and the follower 77 is intercepted and engaged by the lugs 76, at the position shown in FIG. 8, whereupon the follower 77 is reciprocated as indicated by the arrow in said figure.

The drive 78 can vary in design and preferably involves an elongate band 80 of flexible material confined to operate in a guide 81 that warps or bends the band 80. As clearly shown, one end of the band 80 is joined to the follower 77 while the other end carries the part 75. The guide 81 turns the intermediate portion of the band 80 through 180° so that reciprocation of the follower 77 caused by engagement of the lugs 76 results in pushing of envelopes off the centering roll 60 and onto the conveyor belt 70 just ahead of the upwardly moving cleat-shaped lug 76 as said lug tracks over the roller 71. When this operation is completed the follower 77 is released by the lug 76 which then moves upwardly over the roller 71 there being a return means 82 in the form of a spring that pulls the parts of the means G to a normal unactuated position for engagement by the next lug 76.

The unfolding means H is best illustrated in FIGS. 9 and 10 and is provided to cooperate with the belt 70 of the conveyor F to lift and fold back the uppermost face of the envelope X, which face has been cut and severed from the opposite face by destruction of the said three edges, 11, 12 and 13 or 14. The means H involves a lifter 85 for raising the uppermost face of the envelope and a lip 86 for engaging and folding back said lifted face as the envelope advances with the conveyor belt 70. The lifter 85 is preferably a pneumatic means comprising a suction tube 87 connected to an air suction line 88. The tube 87 is in communication with the line 88 and is closed at its terminal end and extends transversely of the belt 70 and spaced somewhat therefrom. The tube 87 is parallel with the top of the belt 70 and has a downwardly faced opening or perforations therethrough. Thus, when the envelope X passes therethrough the uppermost face thereof is lifted or raised and temporarily positioned above the other face of the envelope and the contents Y thereof. The lip 86 is spaced a short distance forward of the tube 87 in the direction of movement and is a straight blade-shaped part that extends transversely and parallel with the said tube 87. The lip 86 is spaced below the tube 87 in order to engage under the lifted face of the envelope and as the envelope moves and advances the said lifted face is forced back and then pulled away from the suction tube and then folded downwardly onto the belt 70.

In order to accomplish the foregoing unfolding process, it is necessary to have sufficient traction of the belt 70 with the individual envelopes X. Therefore, the retaining means I is provided as best illustrated in FIG. 11 and which presses and secures the said envelopes in pressured engagement with the moving conveyor belt. In the particular case illustrated, the retaining means I involves its own conveyor 90 (see FIG. 11) and presser means 91 that overlies said conveyor to assure traction with the envelopes to pull them through the unfolding means H and there is a smooth plate 92 that extends from delivery end of the conveyor F in the plane of the top thereof.

The conveyor 90 of the means I is a belt-type conveyor involving a continuous flexible belt 93 extending between spaced rollers 94 driven by a motor 95 through a suitable drive. The presser 91 overlies the conveyor 90 and has an extension 91' to overlie the plate 92. The said presser 91 and extension 91' are also belt-type devices, the presser involving one or more adjacent and continuous flexible belts 95 extending between pulleys 96, the extension involving extensions 95' of said belts and extending from pulleys 96 to pulleys 96', as shown. The belt extension 95' oppose the plate 92 and conveyor belt 93 to the end that the envelopes are engaged by the traction belts to be advanced. As shown, the motor drives both belts 95 and extensions 95' and is energized through a switch 97 (see FIG. 5) and through a variable speed control (not shown). It will be apparent that the envelopes are drawn from the conveyor F and through the unfolding means H in the manner above described.

The above described conveyor 90 delivers cut and opened envelopes at the rear end 17 of the housing A in a horizontal plane and moving or advancing rearwardly. The delivery conveyor J is provided to receive the cut and opened, or unfolded envelopes X and as best illustrated in FIG. 13 of the drawings is a belt-type conveyor involving a continuous flexible belt 100 extending between rollers 101 and driven by a motor 102 through a suitable drive. The motor is energized through a switch 103 (see FIG. 5) and through a suitable variable speed control (not shown). The conveyor J forms an extension of the secondary conveyor F, as does the intermediate conveyor 90 of the retaining means I, and the last described conveyor J is of substantial length, the cut and opened envelopes X being distributed therealong with the contents Y thereof exposed.

From the foregoing, the handling and processing of the envelopes X should be clear and each of the above described means functioning to perform or facilitate the processes involved. The machine or apparatus is activated by closing the switches thereby energizing the various drive motors. The exact timing and speed or frequency of delivery can be readily established by controlling the speed of the drive motors, the sealed envelopes X being applied or deposited on the stack S at the feed chute and the cut and opened or unfolded envelopes being continuously delivered on the conveyor J. In order to assure adherence of the opened envelopes X and contents Y to the delivery conveyor J, an electrostatic charging means 110 is provided in the form of a brush 111, for example of suitable animal hair that frictionally engages beneath the belt 100 in order to charge the said belt to attract the envelopes and the contents thereof.

Having described only the typical preferred form and application of our invention, we do not wish to be limited or restricted to the specific details herein set forth, but wish to reserve to ourselves any variations or modifications that may appear to those skilled in the art and fall within the scope of the following claims.

Having described our invention, we claim:

1. An apparatus for processing envelopes whereby said envelopes are opened for access to the contents thereof, and including, a conveyor with a moving surface to receive and support and move an envelope with the edge portion thereof projecting from the conveyor, and edge cutting means at the conveyor and comprising a head shiftably carried on a pivotally supported arm and said arm being biased to urge the head to engage the envelope and spaced electrodes carried by the head and charged to strike a continuous arc through an edge of said envelope and operable to destroy the said edge as it passes by said means.

2. An apparatus for processing envelopes whereby said envelopes are opened for access to the contents thereof, and including, a conveyor with a moving surface to receive and support and move an envelope with the edge portion thereof projecting from the conveyor, and edge cutting means at the conveyor and comprising a head shiftably carried on a pivotally supported channel-shaped arm to receive and guide the edge of the envelope to the head and said arm being biased to urge the head to engage the envelope and spaced electrodes carried by the head and charged to strike a continuous arc through an edge of said envelope and operable to destroy the said edge as it passes by said means.

3. An apparatus for processing envelopes whereby said envelopes are opened for access to the contents thereof, and including, a primary conveyor with a surface to receive and support envelopes disposed in one rotative position and to move them in one direction, an edge cutting means at said primary conveyor and engageable with an edge of the envelope, a secondary conveyor with a surface disposed at a right angle to the primary conveyor to receive envelopes from the primary conveyor and support them in said rotative position and move them in a direction normal to movement by the primary conveyor, and an edge cutting means at said secondary conveyor and engageable with an edge of the envelope, each of said cutting means comprising a head shiftably carried on a pivotally supported arm and biased to engage the head with the envelope and spaced electrodes carried by the head and charged to strike a continuous arc through an edge of said envelope and being operable to destroy said edge as it passes by said means.

4. An apparatus for processing envelopes whereby said envelopes are opened for access to the contents thereof, and including, a primary conveyor with a surface to receive and support envelopes disposed in one rotative position and to move them in one direction, an edge cutting means at said primary conveyor and engageable with an edge of the envelope, a secondary conveyor with a surface disposed at a right angle to the primary conveyor to receive envelopes from the primary conveyor and support them in said rotative position and move them in a direction normal to movement by the primary conveyor, and an edge cutting means at said secondary conveyor and engageable with an edge of the envelope, each of said cutting means comprising a head shiftably carried on a pivotally supported channel-shaped arm and biased to engage the head with the envelope and spaced electrodes carried by the head and charged to strike a continuous arc through an edge of said envelope and being operable to destroy said edge as it passes by said means.

5. An apparatus for processing envelopes whereby said envelopes are opened for access to the contents thereof, and including, supply means adapted to consecutively issue envelopes into the apparatus, cutting means operable to destroy an edge of each envelope and comprising a shiftable head biased toward the envelope and spaced electrodes carried by the head and charged to strike a continuous arc through said edge, and means to move each envelope relative to the head whereby an edge of the envelope is destroyed.

6. An apparatus for processing envelopes whereby said envelopes are opened for access to the contents thereof, and including, supply means adapted to consecutively issue envelopes into the apparatus, normally related cutting means and each disposed to destroy an edge of each envelope and comprising a shiftable head biased toward the envelope and spaced electrodes carried by the head and charged to strike a continuous arc through said edge, and means to move each envelope relative to the head of each of said cutting means respectively, whereby normally related edges of the envelopes are destroyed.

7. An apparatus for processing envelopes whereby said envelopes are opened to expose the contents thereof, and including, a primary conveyor to receive envelopes disposed in one rotative position and to move them in one direction, a cutting means adjacent one side of said primary conveyor, a secondary conveyor disposed at a right angle to the primary conveyor to receive envelopes from the primary conveyor in said rotative position and move them in a direction normal to movement by the primary conveyor, cutting means adjacent opposite sides of said secondary conveyor, each of said cutting means being operable to destroy an edge of said envelope as it passes by said means, and unfolding means receiving envelopes delivered by the secondary conveyor and with pneumatic suction to engage opposite faces of the envelope and operable to separate the envelope at the three destroyed edges thereof and to thereby expose the contents thereof.

8. An apparatus for processing envelopes whereby said envelopes are opened to expose the contents thereof, and including, a primary conveyor to receive envelopes disposed in one rotative position and to move them in one direction, a cutting means adjacent one side of said primary conveyor, a secondary conveyor disposed at a right angle to the primary conveyor to receive envelopes from the primary conveyor in said rotative position and move them in a direction normal to movement by the primary conveyor, a cutting means adjacent opposite sides of said secondary conveyor, each of said cutting means being operable to destroy an edge of said envelope as it passes by said means, and unfolding means receiving envelopes delivered by the secondary conveyor and with pneumatic suction to engage opposite faces of the envelope and operable to separate the envelopes at the three destroyed edges thereof and with a lip engageable beneath one face of the envelopes to fold back said one face and to thereby expose the contents thereof.

9. An apparatus for processing envelopes whereby said envelopes are opened to expose the contents thereof, and including a primary conveyor to receive envelopes disposed in one rotative position and to move them in one direction, a cutting means adjacent one side of said primary conveyor, a secondary conveyor disposed at a right angle to the primary conveyor to receive envelopes from the primary conveyor in said rotative position and move them in a direction normal to movement by the primary conveyor, a cutting means adjacent opposite sides of said secondary conveyor, each of said cutting means being operable to destroy an edge of said envelope as it passes by said means, unfolding means receiving envelopes delivered by the secondary conveyor and with pneumatic suction to engage opposite faces of the envelope and operable to separate the envelopes at the three destroyed edges thereof and with a lip engageable beneath one face of the envelopes to fold back said one face and to thereby expose the contents thereof, and means to engage the other face of and draw said envelopes from the unfolding means and comprising a conveyor and an overlying traction means to engage the envelopes therebetween.

10. An apparatus for processing envelopes whereby said envelopes are opened to expose the contents thereof, and including a primary conveyor to receive envelopes disposed in one rotative position and to move them in one direction, a cutting means adjacent one side of said primary conveyor, a secondary conveyor disposed at a right angle to the primary conveyor to receive envelopes from the primary conveyor in said rotative position and move them in a direction normal to movement by the primary conveyor, a cutting means adjacent opposite sides of said secondary conveyor, each of said cutting means being operable to destroy an edge of said envelope as it passes by said means, and a transfer means at the discharge end of the primary conveyor and engageable with envelopes delivered thereby and comprising lugs on the secondary conveyor and a reciprocable element intermediate the said conveyors and engaged and operated by the lugs to advance the envelopes onto the secondary conveyor.

11. An apparatus for processing envelopes whereby said envelopes are opened to expose the contents thereof, and including, a primary conveyor to receive envelopes disposed in one rotative position and to move them in one direction, a cutting means adjacent one side of said primary conveyor, a secondary conveyor disposed at a right angle to the primary conveyor to receive envelopes from the primary conveyor in said rotative position and move them in a direction normal to movement by the primary conveyor, a cutting means adjacent opposite sides of said secondary conveyor, each of said cutting means being operable to destroy an edge of said envelope as it passes by said means, and a transfer means at the discharge end of the primary conveyor and engageable with envelopes delivered thereby and comprising lugs on and moved by the secondary conveyor and an elongate flexible element intermediate the said conveyors and reciprocably directed through a guide and operated upon engagement by the lugs to advance the envelopes onto the secondary conveyor.

12. An apparatus for processing envelopes whereby said envelopes are opened to expose the contents thereof, and including, a primary conveyor to receive envelopes disposed in one rotative position and to move them in one direction, a cutting means adjacent one side of said primary conveyor, a secondary conveyor disposed at a right angle to the primary conveyor to receive envelopes from the primary conveyor in said rotative position and move them in a direction normal to movement by the primary conveyor, a cutting means adjacent opposite sides of said secondary conveyor, each of said cutting means being operable to destroy an edge of said envelope as it passes by said means, and a transfer means at the discharge end of the primary conveyor and engageable with envelopes delivered thereby and comprising cleat-shaped lugs on the secondary conveyor and a reciprocable element intermediate the said conveyors and engaged by the lugs and operable to advance and deposit the envelopes ahead of said cleat-shaped lugs.

13. An apparatus for processing envelopes whereby said envelopes are opened to expose the contents thereof, and including, a primary conveyor to receive envelopes disposed in one rotative position and to move them in one direction, a cutting means adjacent one side of said primary conveyor, a secondary conveyor disposed at a right angle to the primary conveyor to receive envelopes from the primary conveyor in said rotative position and move them in a direction normal to movement by the primary conveyor, a cutting means adjacent opposite sides of said secondary conveyor, each of said cutting means being operable to destroy an edge of said envelope as it passes by said means, and a transfer means at the discharge end of the primary conveyor and engageable with envelopes delivered thereby and comprising cleat-shaped lugs on the secondary conveyor and an elongate flexible element reciprocably directed through a guide and engaged by the lugs and operable to advance and deposit the enevelopes ahead of said cleat-shaped lugs.

14. An apparatus for processing envelopes whereby said envelopes are opened to expose the contents thereof, and including, a primary conveyor to receive and move envelopes in one direction, a cutting means adjacent one side of said primary conveyor, a secondary conveyor to receive envelopes from the primary conveyor and move them in a direction normal to movement by the primary conveyor, a cutting means adjacent opposite sides of said secondary conveyor, each of said cutting means being operable to destroy an edge of said envelope as it is passed by said means, and a centering means at the discharge end of the primary conveyor and comprising a roll with oppositely pitched ribs and coacting to align the envelopes with the receiving end of the secondary conveyor, and a transfer means engageable with envelopes delivered by the primary conveyor and comprising lugs on the secondary conveyor and a reciprocable element engaged by the lugs and operable to advance the envelopes onto the secondary conveyor.

References Cited in the file of this patent

UNITED STATES PATENTS

| | | |
|---|---|---|
| 771,852 | Wolf | Oct. 11, 1904 |
| 965,868 | Byrnes | Aug. 2, 1910 |
| 1,093,763 | Brown | Apr. 21, 1914 |
| 1,135,127 | Der Meersch | Apr. 13, 1915 |
| 2,027,045 | Keiser | Jan. 7, 1936 |
| 2,248,057 | Bond | July 8, 1941 |
| 2,388,069 | Meaker et al. | Oct. 30, 1945 |
| 2,481,048 | Smith | Sept. 6, 1949 |